(12) United States Patent
Wisler et al.

(10) Patent No.: US 8,952,700 B2
(45) Date of Patent: Feb. 10, 2015

(54) METHOD FOR MINIMIZING DELAYS WHILE DRILLING USING A MAGNETIC RANGING APPARATUS

(75) Inventors: Macmillan M Wisler, Kingwood, TX (US); Robert A Aiello, Spring, TX (US); Tommy L Binford, Jr., Montgomery, TX (US); Harry M Collins, Katy, TX (US); James D Elmore, Houston, TX (US); John D Martin, Houston, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 941 days.

(21) Appl. No.: 13/016,731

(22) Filed: Jan. 28, 2011

(65) Prior Publication Data

US 2012/0194195 A1 Aug. 2, 2012

(51) Int. Cl.
*G01V 3/08* (2006.01)
*E21B 47/022* (2012.01)

(52) U.S. Cl.
CPC .............. *E21B 47/02216* (2013.01)
USPC ............. 324/346; 324/326; 175/45

(58) Field of Classification Search
USPC .............. 324/345–346, 326; 175/45
See application file for complete search history.

(56) References Cited

U.S. PATENT DOCUMENTS

| | | | |
|---|---|---|---|
| 4,372,398 A | 2/1983 | Kuckes | |
| 4,700,142 A | 10/1987 | Kuckes | |
| 4,710,708 A | 12/1987 | Rorden et al. | |
| 5,485,089 A * | 1/1996 | Kuckes | 324/346 |
| 5,512,830 A * | 4/1996 | Kuckes | 324/346 |
| 5,923,170 A | 7/1999 | Kuckes | |
| RE36,569 E | 2/2000 | Kuckes | |
| 6,774,624 B2 | 8/2004 | Anderson et al. | |
| 6,842,699 B2 | 1/2005 | Estes | |
| 7,170,423 B2 | 1/2007 | Wisler et al. | |
| 7,477,162 B2 | 1/2009 | Clark | |
| 7,703,548 B2 * | 4/2010 | Clark | 175/45 |
| 2009/0308657 A1 | 12/2009 | Clark et al. | |

OTHER PUBLICATIONS

A. F. Kuckes, New Electromagnetic Surveying/Ranging Method for Drilling Parallel Horizontal Twin Wells, SPE Drilling & Completion, Jun. 1996, pp. 85-90, Society of Petroleum Engineers, US.
Tracy L. Grills, Magnetic Ranging Technologies for Drilling Steam Assisted Gravity Drainage Well Pairs and Unique Well Geometries, SPE/Petroleum Society of CIM/CHOA 79005, Nov. 2002, pp. 1-8, Society of Petroleum Engineers, Canada.

* cited by examiner

*Primary Examiner* — Jay Patidar
(74) *Attorney, Agent, or Firm* — Mark A. Oathout; Oathout Law Firm (57) ABSTRACT

A method and system is provided for minimizing delays in a magnetic ranging method. Delays are minimized by establishing synchronicity between triggering of a three-axis magnetometer and energization of a solenoid assembly deployed in the borehole being drilled and the first borehole, respectively. Synchronicity enables measuring various components of the alternating magnetic field created by energization of the solenoid assembly by the magnetometer, the moment the solenoid assembly is energized. The recorded components are used for computation of steering data for drilling the second borehole relative to the first borehole. The steering data can be determined at the surface or downhole.

30 Claims, 8 Drawing Sheets

METHOD FOR MINIMIZING DELAYS WHILE DRILLING USING A MAGNETIC RANGING APPARATUS

FIELD OF THE INVENTION

The present invention relates to a method and apparatus for determining the relative location of one specified borehole path to a previously-drilled first or target borehole. More particularly, the present invention relates to establishing synchronicity between triggering of a three-axis magnetometer and energising of spaced magnetic sources deployed in the borehole being drilled and the first borehole, respectively, for reducing delays between course corrections.

BACKGROUND OF THE INVENTION

"Magnetic ranging" is a term given to determining the relative location of magnetic sources and magnetic detectors. It is known to apply magnetic ranging for guiding the drilling of one borehole in subterranean formations relative to another previously-drilled borehole.

The use of DC or low frequency magnetic fields for ranging is especially applicable in the subterranean environment because, unlike high frequency electromagnetic and acoustic methods, the fields are usually not affected by the earth formations. In most earth formations the magnetic permeability, which affects low frequency or DC magnetic fields, is usually constant and nearly equal to that of free space, whereas the resistivity and speed of sound which affect higher frequency electromagnetics and acoustics vary widely. A survey of magnetic ranging techniques and their use, included by reference in this patent, is in a paper by Grills et al. "Magnetic Ranging Technologies for Drilling Steam Assisted Gravity Drainage Well Pairs and Unique Well Geometries—A comparison of Technologies" SPE/Petroleum Society of CIM/CHOA 79005, Calgary, Alberta, Canada, 4-7 Nov. 2002 ("Grills"). Particular prior art applications of this technology, also included in this patent by reference, are described in U.S. Pat. No. 4,710,708, titled "Method and Apparatus Employing Received Independent Magnetic Field Components of a Transmitted Alternating Magnetic Field for Determining Location", issued to Rorden et al. on Dec. 1, 1987, in CA Patent 2,147,610 ("Rorden"), in U.S. Reissue Pat. Re 36,569 of U.S. Pat. No. 5,485,089, titled "Method and Apparatus for Measuring Distance and Direction by Movable Magnetic Field Source" issued to Arthur Kuckes on Feb. 15, 2000 ("Kuckes"), and in US Patent Application No. 2009/0308657, titled "Magnetic Ranging And Controlled Earth Borehole Drilling" to Clark et al. ("Clark").

These references describe methods using low frequency, elongated solenoid transmitter source(s) and three-axis magnetic field detector(s) for subterranean ranging. As described in the Grills reference above a particular use of magnetic ranging is to very accurately guide the drilling of a second borehole a specified distance and direction from a first or target borehole. A number of error sources are inherent in the prior art.

A major problem encountered in the prior art is the delay introduced during measurement of the magnetic field generated by energisation of solenoid sources. Delay in obtaining measurements impacts the ability to make course corrections. As Applicant understands it, in a conventional magnetic ranging method described in Kuckes and Clark, the measurement steps are as follows: the drilling is stopped and the solenoid sources are energised from the surface by passing either a DC current (Kuckes) or an AC current (Clark). The MWD including a three-axis magnetic field detector or three-axis magnetometer detects that drilling has stopped and activates the detector. The detector waits a first delay before measuring the various components of the magnetic field. This is because the detector is not aware whether or when the solenoid sources have been triggered and therefore whether the field being measured by the detector is the field generated by the energisation of the solenoid sources or other magnetic sources. In order to confirm whether the measured value relates to the magnetic field generated by the energisation of the solenoid sources, the detector compares the measured value with a reference value stored therein and which distinguishes solenoid activity from non-solenoid activity. If the measured value does not match the reference value, the MWD waits again for a pre-set period of time before taking another measurement. The whole process is repeated till the measured value satisfies the reference value. This verification introduces further delays in the measurement process. If the measured value matches the reference value, the measured value is typically transmitted to the surface through the drilling mud by resuming drilling as described in Kuckes. In Clark the measured value is transmitted to the surface via electromagnetic telemetry. Drilling need not be resumed to transmit the measured value to the surface in Clark. If, at the surface, it is determined that the measured value cannot be used to chart a corrective course, the whole process has to be repeated.

Uncertainty as to whether the field being measured by the detector is one that is created by the magnetic sources results in the first delay and the verification process described in the foregoing paragraph results in the second delay. These delays in the measurement process slow down the progress of drilling and can affect the accuracy and tortuosity of the second borehole.

Another problem encountered in Kuckes and Clark is when the MWD erroneously detects the state of the pumps and tool rotation. The survey can be started only when the tool is not rotating and the pumps are off. This state is normally is determined by the MWD tool by detecting small vibrations due to the mud flow in the pipe. This is subject to error. False detection of the state of the pumps by the MWD can result in a survey not being started at all or recorded data or values not being transmitted to the surface. Start of the survey is solely dependent on the MWD detecting the state of the pumps. If the MWD does not recognize pumps are off, it does not activate the detector for staring the survey. In this case when the pumps are turned on again the MWD would not begin pulsing data. The surface operator will then recognize that no pulses are being received and restart the measurement sequence by turning the pumps off. When the pumps have been off, sometimes the MWD tool also does not recognize the pumps being turned on once again and so does not send any data at all. This uncertainty results in further delays.

Fields generated or created due to the energisation of the solenoids fall off very quickly. Therefore, it is essential that the fields be measured as soon as they are created.

It is difficult to hold the tool completely still for a prolonged duration of time. A slight movement of the tool during the survey results in erroneous values being recorded. In Kuckes, for energisation of the solenoid current is passed in each direction for 30 seconds. Current is passed for 30 seconds in each direction because, the MWD waits a first delay, as explained above, before starting to record or measure. It is very difficult to hold the tool completely still for 60 seconds and the chances of getting a correct reading in Kuckes is, therefore, difficult.

In the prior art, errors can also be made when the boreholes are assumed to be parallel. While this assumption significantly simplifies the data reduction, the assumption can also result in convergence or divergence of the second and first boreholes. If the boreholes are assumed to be parallel, only distance and direction of the first borehole relative to the second borehole in a plane perpendicular to the second borehole are calculated, and not the direction or heading of the second borehole relative to the first borehole. Convergence or divergence of the second borehole from the first borehole cannot be measured until the next distance and direction measurement is taken, whereas if the heading is also measured, the convergence or divergence of the second borehole is known after the first measurement is taken. By measuring heading, a delay until a subsequent measurement is taken is avoided. Delays in determining convergence or divergence can lead to larger amplitude variations (errors) in the distance and direction to the other borehole by delaying the corrective action taken in the drilling of the second borehole.

Also known in the prior art is to make two measurements so that distance and direction may be estimated without knowledge of the dipole strength. In the two measurement method the solenoid is moved from the first position to the second position using a wireline from the surface. However the accuracy of the two measurement method depends on how accurately the distance between the first position and the second position is known. Since the solenoid is deployed in the borehole on a wireline the distance measurement is done from the surface and is subject to error factors such as wireline stretch and encoder wheel slippage. These errors directly affect the calculation distance from the first borehole to the second borehole.

Another error source in the prior art methods is reliance upon an assumption that the solenoid source is represented by a point dipole. If the boreholes are close enough together such that the length of the solenoid is a significant portion of the distance between boreholes the assumption that the solenoid is a point dipole and has no length causes errors especially in the measurement of field strength and distance between boreholes.

Another prior art error is caused by not determining the dipole strength at each measurement position. This method involves measuring the dipole strength at one position and expecting the solenoid dipole moment to remain the same strength at subsequent measurements. If the solenoid is in a cased borehole, variability in the type of casing will cause variable unknown attenuation of the magnetic field resulting in errors in distance calculations.

Another source of error in the prior art is the location of the magnetic poles at either end of the solenoid. When a prior art solenoid is deployed inside casing there is a "smearing" of the exact location of the solenoid pole ends. Not knowing the exact location of the magnetic source poles can cause large errors when the second borehole is being drilled within about 5 meters of the first borehole.

Considering all of the above error sources in the prior art, there is a need for a more accurate solution to the magnetic ranging problem. The present invention presents a more accurate apparatus and method which eliminates these error sources.

SUMMARY OF THE INVENTION

Apparatus and method are directed to determine steering data for drilling one borehole relative to another borehole. In one embodiment, distance, direction, and orientation of one borehole relative to another borehole is determined by measuring six magnetic components in a second borehole. The magnetic field originates from a magnetic transmitter assembly or solenoid assembly in a previously-drilled, first borehole. The magnetic components are measured by a three-axis magnetic field detector or three-axis magnetometer or three-axis magnetic field sensor in the second borehole, the operation or triggering of which is synchronised with the activation of the magnetic source assembly through energisation of the field sources. Synchronicity between the magnetometer and the magnetic transmitter assembly eliminates delays introduced during measurement including that due to uncertainty as to whether the magnetic field being measured by the detector is one created by the energisation of the magnetic transmitter assembly or some other magnetic source. Synchronicity between the magnetometer and the magnetic transmitter assembly also results in reduction in survey time.

In one embodiment, the magnetic transmitter assembly comprises two magnetic field sources, which can be spaced by a rigid, non-magnetic spacer of known spacer distance. Accurate knowledge of the spacing between the two magnetic field sources enables determination of the distance, direction, and orientation of the boreholes regardless of the relative orientation therebetween. In operation a three-axis magnetometer is placed in a second borehole being drilled on a prescribed course relative to a previously-drilled first borehole. The first borehole may or may not be cased. The three-axis magnetometer is preferably located in an MWD (Measurement While Drilling) tool being used in the drilling of the second borehole. The two magnetic field sources are provided as a solenoid assembly consisting of two axially oriented and rigidly connected solenoids (the two magnetic field sources) The solenoid assembly is positioned by wireline methods in the first borehole approximately opposite the magnetometer in the second borehole. The solenoids are independently and sequentially energized to produce an alternating magnetic field in the second borehole. The energising of the solenoids is synchronous with the triggering of three-axis magnetometer. The three-axis magnetometer is triggered using electromagnetic (EM) telemetry from the surface. The synchronisation between the triggering and energisation actions enables measurement and recordation of various measured components of the alternating magnetic field by the three-axis magnetometer as soon as the solenoids are energised. Orthogonal Cartesian components of the magnetic fields are measured and recorded by the magnetometer in the MWD tool and a data recorder such as an onboard computer. The solenoid assembly and the magnetometer are held stationary during the measurements and as a result six independent measurements of the solenoid fields are made and sent to the surface via EM telemetry.

In one embodiment, a method is provided for minimizing delays in a magnetic ranging method while drilling a second borehole relative to a previously-drilled first borehole. The second borehole has a three-axis magnetometer deployed downhole therein and the first borehole has a solenoid assembly deployed therein. The method comprises positioning the solenoid assembly in the first borehole approximately opposite the magnetometer in the second borehole and starting a survey with the magnetometer being rotationally stationary. The survey starts by triggering the magnetometer using electromagnetic (EM) telemetry synchronous with energizing of the solenoid assembly from surface to produce an alternating magnetic field in the second borehole and measuring components of the alternating magnetic field by the magnetometer as soon as the solenoid assembly is energised. From the measured components, one can determine steering data for drilling the second borehole relative to the first borehole.

In another embodiment, the second borehole has a three-axis magnetometer and a three-axis accelerometer deployed therein. Two magnetic field sources are provided, being a first magnetic field source and a second magnetic field source being spaced by a rigid, non-magnetic spacer of known spacer distance. The two magnetic field sources are positioned in the first borehole approximately opposite the magnetometer in the second borehole and the survey is started with the magnetometer being rotationally stationary. The method further comprises triggering the magnetometer using electromagnetic telemetry (EM) synchronous with energizing of the two magnetic field sources from surface to produce an alternating magnetic field in the second borehole. One commences measuring components of the alternating magnetic field by the magnetometer and the three-axis accelerometer as soon as one of the two magnetic field sources is energised. The distance, direction and orientation of the second borehole relative to the first borehole is determined using the measured components of the alternating magnetic field, the three-axis acceleration data and spacer for drilling the second borehole.

An embodiment of a system is provided for performing the methods described herein. One system comprises a survey system for synchronous energisation of the magnetic transmitter assembly from surface and triggering of the magnetometer using electromagnetic (EM) telemetry, the survey system communicating with the three-axis magnetometer through a surface EM transceiver and a downhole EM transceiver. Energisation of the magnetic transmitter assembly produces an alternating magnetic field in the second borehole, components of the alternating magnetic field being measured at the magnetometer. A processor is provided for determining steering data for drilling the second borehole relative to the first borehole using the measured components of the alternating magnetic field for use by the three-axis magnetometer in communication with the survey system.

Data reduction, which in one embodiment is performed at the surface, is accomplished by inverting the telemetered measurements using a successive approximation technique to produce not only the distance and direction of one borehole relative to the other but also the heading of the second borehole to the target or first borehole. As the distance between the solenoids in the solenoid assembly is precisely known, more accurate and timely information is available to direct the second borehole in a specified course, without imprecise repositioning either the solenoid assembly or the magnetometer.

In addition, the second borehole can be steered at any relative orientation to the first borehole. For example, in some applications it may be desirable to steer the second borehole at a relative azimuth that is 90 degrees different from the first borehole. Unlike the prior art, embodiments of the invention do not rely on any assumptions about the relative heading of the two boreholes. Accordingly, the second borehole may be drilled to cross or deviate from the path of the first borehole at a prescribed distance and any prescribed angle,

DETAILED DESCRIPTION OF THE PREFERRED EMBODIMENTS

Figure 1:
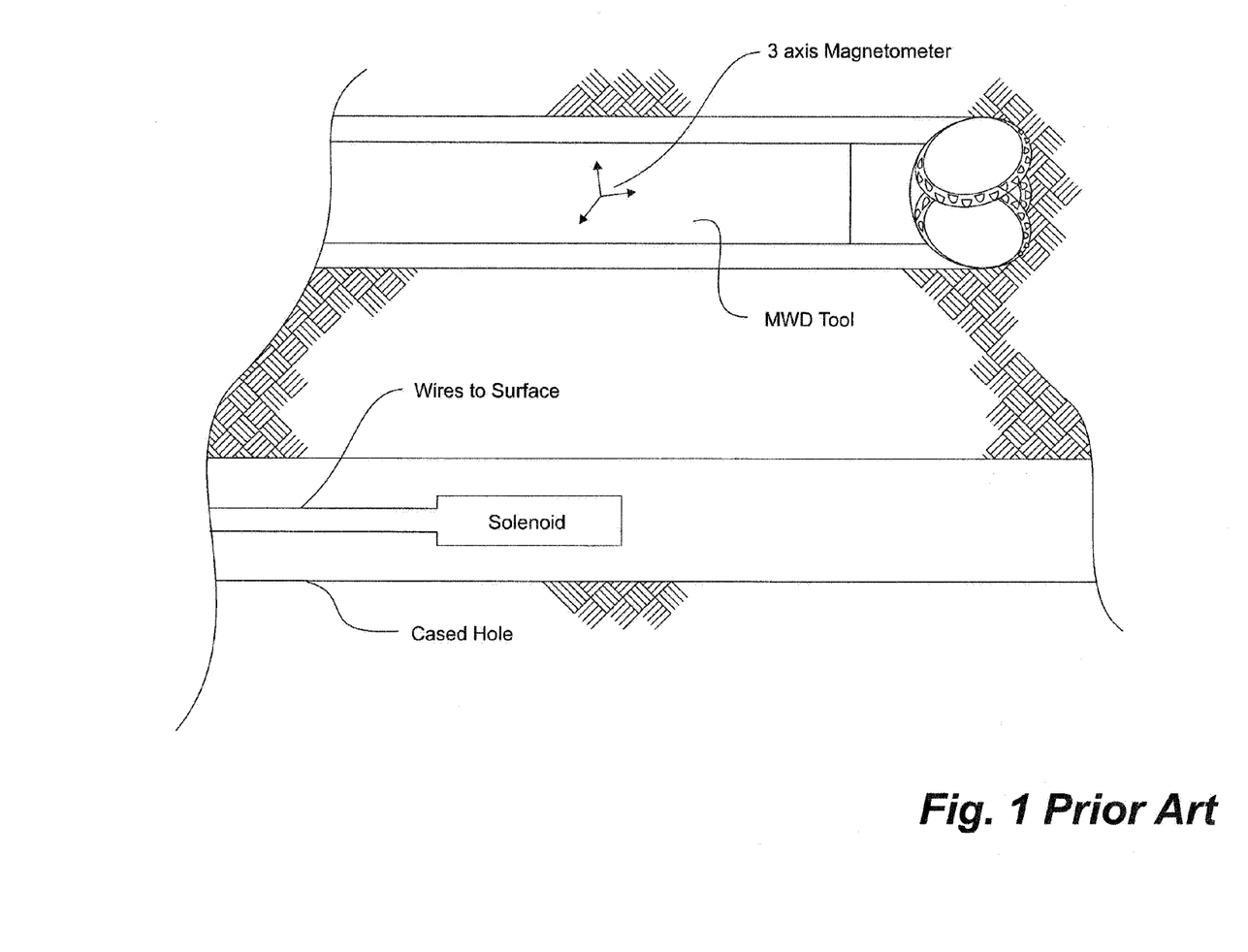
FIG. 1 is a schematic illustration of prior art apparatus and methodology using a single solenoid and single magnetometer wherein the source strength is known and only one solenoid position is employed.
Figure 2:
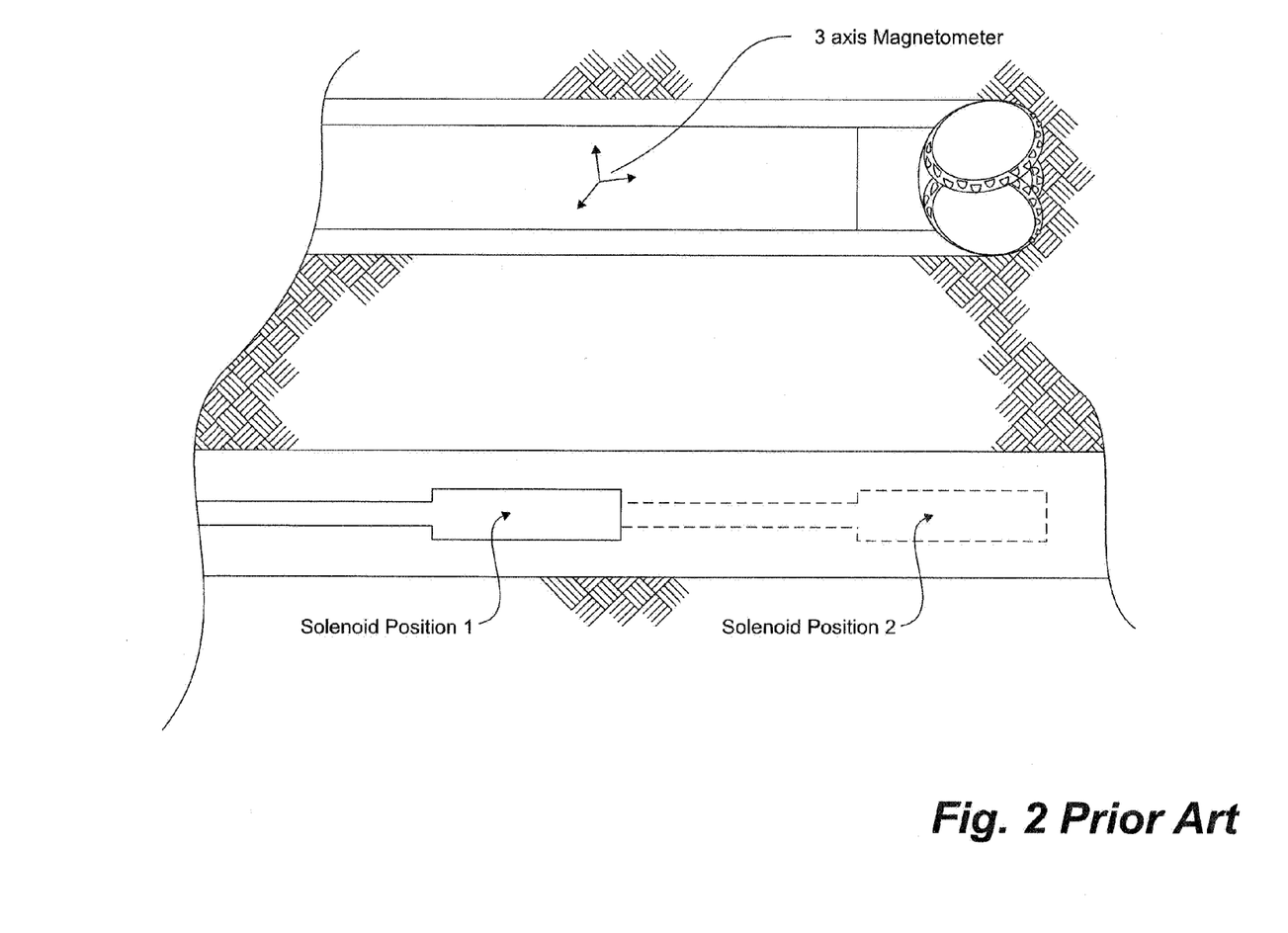
FIG. 2 is a schematic illustration of prior art apparatus and methodology using a single solenoid and single magnetometer wherein the single solenoid is moved between two positions relative to the single magnetometer.

FIGS. 1 and 2 illustrate prior art methodology for using a single solenoid and single magnetometer for accurately determining spacing between adjacent boreholes and minimizing delays between course corrections or adjustments. In FIG. 1, the source strength of the prior art single solenoid is known so that only one solenoid position need be employed. In FIG. 2, the source strength of the single solenoid need not be known in the prior art methodology where the single solenoid is moved between two positions relative to the single magnetometer. In both prior art methodologies of FIGS. 1 and 2, if the boreholes are parallel, or assumed to be parallel, the relative distance and direction can be solved directly such as using mathematical techniques set forth in Kuckes.

Figure 5A:
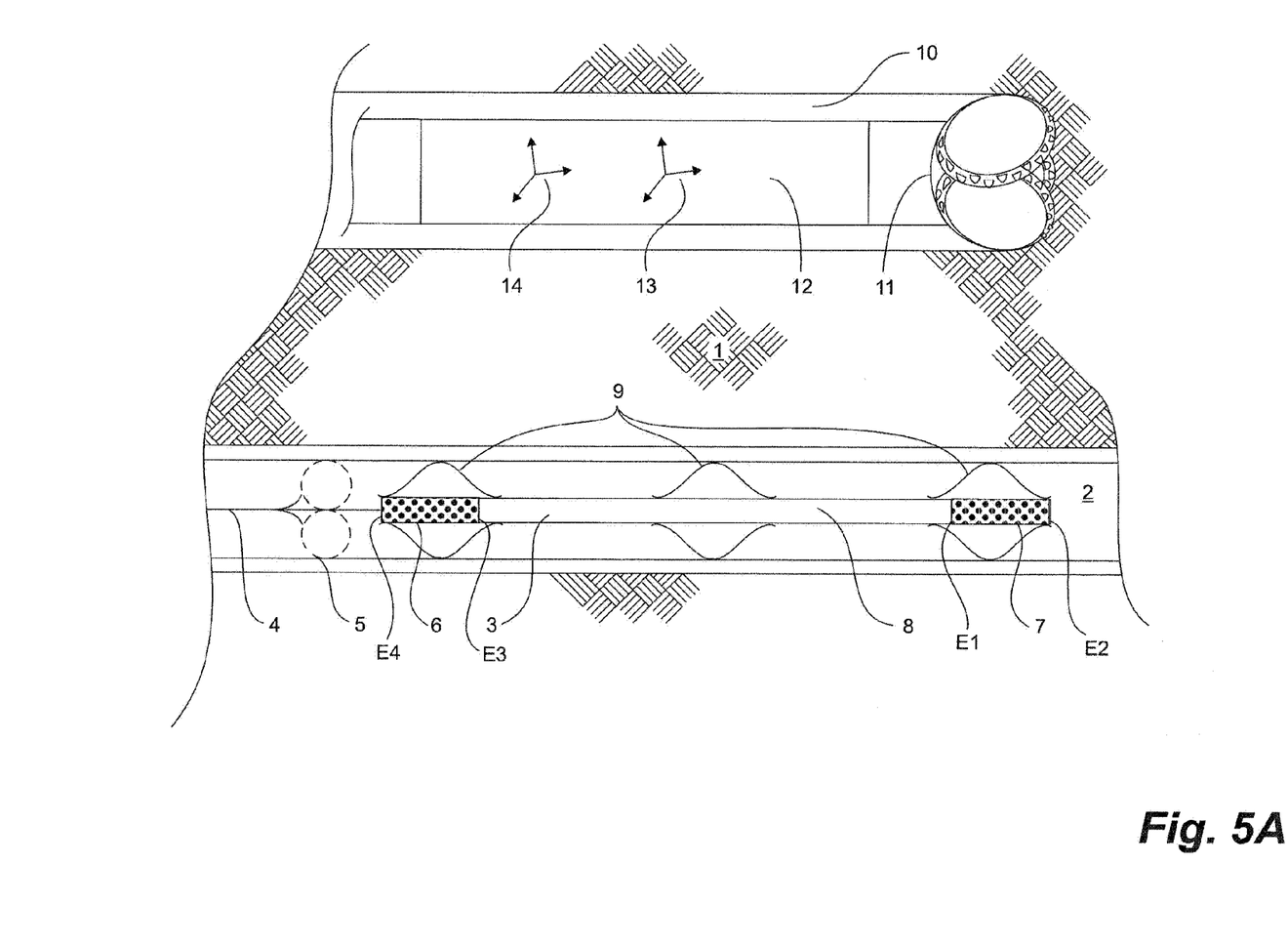
FIG. 5A is a schematic illustration of one embodiment of the present invention comprising two solenoids spaced by known distance and a single magnetometer.

In embodiments disclosed herein, the boreholes need not be parallel, magnetic field source strength need not be known and conventional sources of measurement errors are avoided including those associated with repositioning of the field sources. With reference to FIG. 5A, an embodiment of a magnetic ranging system and method comprises a magnetic transmitter assembly or solenoid assembly 3 positioned within a target, or first borehole 2, located in a previously-drilled formation 1. The transmitter assembly comprises dual magnetic field sources comprising first and second solenoids 6, 7. The first solenoid 6 forms the first magnetic field source and the second solenoid forms the second magnetic field source.

The solenoids 6,7 are rigidly spaced apart at a known and fixed distance by a non-magnetic, interconnecting member or rigid solenoid spacer 8. An exemplary arrangement includes solenoids 6, 7 which are each 2.5 m in length and the rigid solenoid spacer 8 is 7.5 m in length. Each solenoid 6, 7 has pole ends E1, E2 and E3, E4 respectively, the dimension between which is also known. Accordingly, the axial spacing or dimensions of the solenoid assembly 3 are known. The solenoids 6, 7 are preferably identical.

A drilling assembly 11 incorporating a measurement while drilling (MWD) tool 12 is located in an adjacent and second borehole 10 which is in the process of being drilled. The MWD tool 12 comprises at least a three-axis magnetic sensor, detector or magnetometer 13. The drilling assembly further comprises conventional circuitry for receiving and transmitting drilling information signals or steering data from the surface for drilling of the second borehole relative to the first borehole. There are a number of ways the MWD can be located in the second borehole. The MWD can be located by a drill string or by coiled tubing. The drill string can be rotated for driving a drill bit, or stationary, being fit with a mud motor for drilling.

The first borehole is drilled and its path recorded using standard borehole surveying methods such as measurement while drilling surveys. The coordinates of the magnetometer 13 of the MWD tool 12 are recorded. During operation the MWD tool 12 is deployed in the adjacent and second borehole 10 which is being drilled in a specified, relative, geometrical relationship to the first borehole 2. A ranging procedure or survey is initiated when the MWD 12 is rotationally stationary. The MWD 12 and the magnetometer 13 can be held substantially and rotationally stationary while drilling, or drilling can be stopped so as to render the magnetometer 13 rotationally stationary. If the MWD 12 is located at the end of a rotating drill string, drilling would have to be stopped, before the survey is started, for holding the magnetometer 13 rotationally stationary. Stopping drilling comprises stopping rotation of a rotating drill string from the surface. However, if the MWD 12 is located at the end of a non-rotating coiled tubing or drill string fit with a mud motor, the MWD 12 would already be substantially and rotationally stationary and, therefore, drilling would not necessarily have to be stopped before starting the survey. As used herein, substantially stationary, means the MWD is not rotating but could still have lateral displacement along the second borehole. Conveniently, a ranging procedure can occur when stopping drilling for insertion of another pipe stand. The results of the ranging procedure are used to guide incremental drilling.

In other embodiments, the steering data or the distance, direction and orientation can be determined by a processor located downhole or at the surface. The solenoid assembly or magnetic transmitter assembly 3 is deployed or conveyed into the first borehole 2 and is connected by wireline 4 to a controlling surface unit (not shown). For conducting measurements, the solenoid assembly 3 is positioned in the first borehole 2 such that the midpoint of the solenoid spacer 8, being midpoint between the solenoids 6,7, is approximately opposite coordinates of the magnetometer 13 of the MWD tool 12 in the second borehole 10. The first solenoid 6 and the second solenoid 7 are sequentially energized for generating measured components of the first and second magnetic flux densities recorded at the magnetometer 13. In one embodiment, the solenoid assembly 3 is energised by passing DC current in each of a first and a second direction for a duration of 3-10 seconds.

As the second borehole can be at angle relative to the first borehole, a reference to approximately opposite or opposite the magnetometer means as near to a point of closest proximity thereto, understanding that midpoint of the solenoid assembly 3 may be oriented alongside each other or at an angle to about perpendicular to the magnetometer 13. The solenoid assembly 3 is positioned at a known depth in the first borehole 2 such as by using a downhole tractor 5. Centralizers 9 are used to centralize the solenoid assembly 3 in the first borehole 2.

Figure 5B:
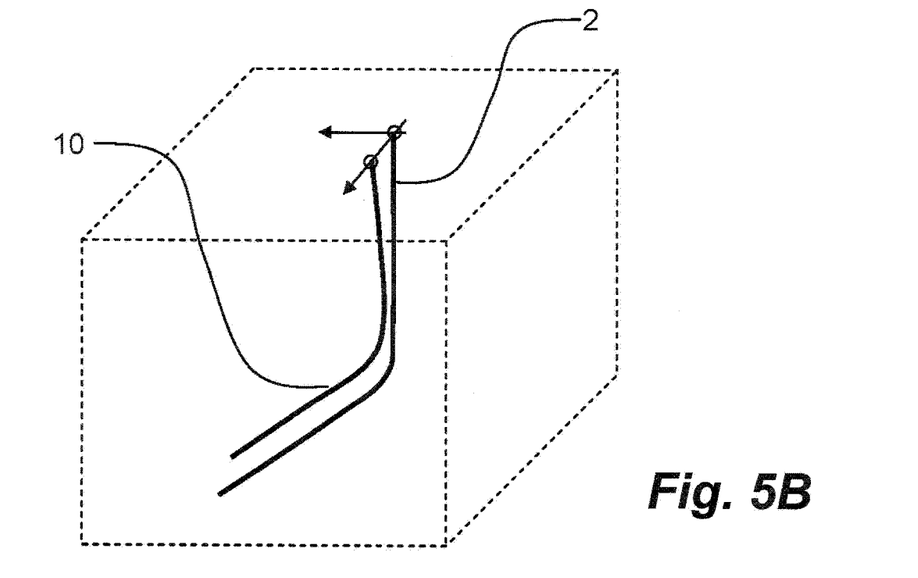
FIG. 5B is a schematic illustration of a second borehole being drilled substantially parallel to the first borehole.
Figure 5C:
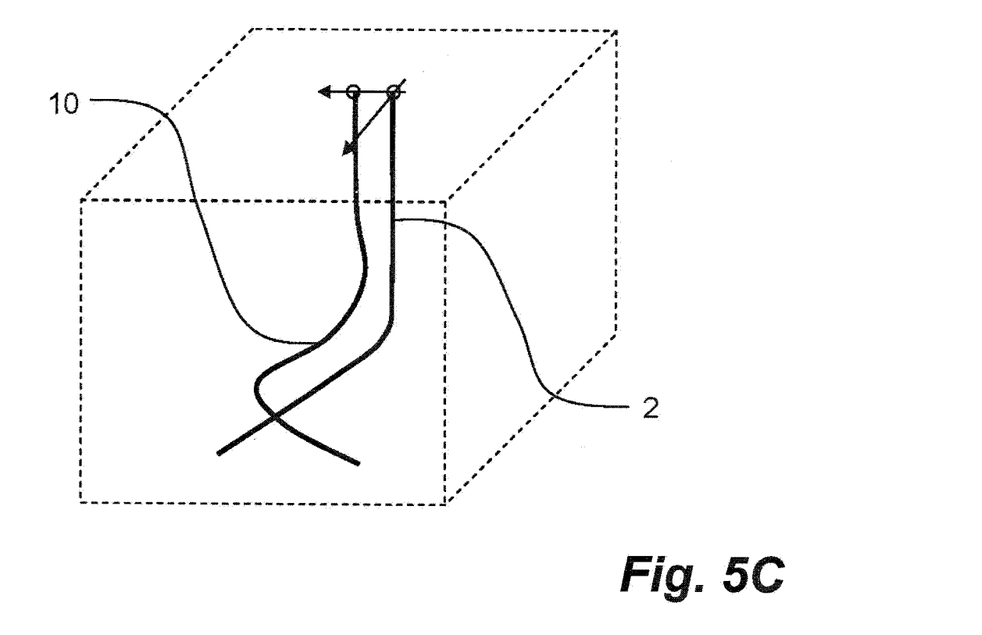
FIG. 5C is a schematic illustration of a second borehole, at least a portion of which is being drilled perpendicular to the first borehole.

As shown in FIGS. 5A and 5B, the solenoids and magnetometer can reside in boreholes that are side by side. Further, in one example shown in FIG. 5C and as a result of embodiments of the present invention, the boreholes may also be at any angle relative to each other.

The first and second solenoids 6,7 are controllable magnetic field sources which are sequentially energized for producing magnetic fields, the magnetic flux densities of which can be measured by the magnetometer 13. The activating the dual magnetic field sources is through a sequential process of energizing the first solenoid 6 and measured components of a first magnetic flux density measured by the magnetometer 13, and energizing the second solenoid 7 and measured components of a second magnetic flux density measured by the magnetometer. The measured components are collected such as by recording.

Some of the challenges with use of magnetic fields and ranging between boreholes include compensating for the solenoid fields themselves and use of casing which is subject to being magnetized by the magnetic survey.

In embodiments of the invention, the magnetic field sources are slowly switched fields between positive and negative states. A square wave field can be operated at a low frequency approximating a slowly varying alternating current at frequencies less than 1 Hz. An example of frequency is in the order of 2 cycles per minute.

The measurement used in the ranging calculations is due to the solenoid field alone. Constant field effects, such as the earth's magnetic field, may be calculated and subsequently eliminated by obtaining the average of both positive and negative magnetic flux data from the magnetic field sources. The constant fields may then be eliminated by subtracting them from measurements made when the solenoids are energized.

Alternatively, one can eliminate constant field effects by obtaining energized magnetic flux data, obtaining de-energized magnetic flux data and taking the difference. Positive and negative magnetic flux data avoids inaccuracies that can be introduced where the first borehole is a cased borehole and the casing becomes magnetized. Accordingly, caution is to be used with magnetized casing. Magnetization errors may be reduced by demagnetizing the casing between measurements or by measuring the magnetic flux data including that due to the magnetized casing with the solenoid off. Either way, the constant field data is subtracted from the magnetic flux data so as to obtain the solenoid measurement data.

In one approach, the first solenoid 6 is activated in a first polarity by an activation current in a first direction. Energizing of the activation current is initiated by wireline 4. The MWD tool is 12 then signalled from the surface to take a survey and record orthogonal Cartesian components or measured components of the magnetic flux density vector $B1+ = (B1x+, B1y+, B1z+)$ using magnetometer 13. Note that "1" in the notation indicates the magnetic flux density measured when the first solenoid 6 is turned on, the second solenoid is off, and the plus sign "+" in the notation is to indicate a first polarity.

The polarity of the first solenoid 6 is then put into an equal but opposite state by reversing the activation current and another survey is taken to obtain the three component vector $B1- = (B1x-, B1y-, B1z-)$, where the minus sign "−" indicates the second or opposite polarity state of the solenoid.

After the magnetic flux density vectors B1+, and B1− are obtained, the first solenoid 6 is then turned off.

The second solenoid 7 is then energized and the same procedure is followed as with the first solenoid resulting in magnetic flux density vector $B2+ = (B2x+, B2y+, B2z+)$ and magnetic flux density vector B2−=(B2x−, B2y−, B2z−), where the 2 in the notation indicates magnetic flux density measurements obtained when the second solenoid 7 is turned on, and the first solenoid 6 is turned off.

When within about 10 meters of magnetized casing, magnetometer data can be compromised. Optionally, such as in instances in which the first borehole 2 is cased, a procedure includes demagnetizing the casing. The first solenoid 6 and surrounding casing are demagnetized using a conventional methodology of applying decreasing oscillating current to the first solenoid 6. In this way errors associated with residual magnetism from the first solenoid 6 and surrounding casing are minimized or avoided in subsequent measurements made when the second solenoid 7 is activated. The term "off" as it is used herein refers to a state in which the voltage (and current) to a solenoid is zero and, as appropriate, when the solenoid and surrounding casing have been demagnetized.

A measurement of the orientation of the MWD tool 12, and therefore the magnetometer 13, relative to the gravity vector (tool face angle and inclination measurement), can also done using a three-axis accelerometer sensor 14 for measuring three-axis acceleration data relative to the earth's coordinate system. For ease of data reduction the axes of the accelerometer sensor 14 and magnetometer 13 are aligned; i.e. (x,y,z) directions are the same for both instruments. The tool face angle is used to mathematically rotate the magnetometer measurements as if the X-axis is vertical up. Accordingly, the direction in the tool's X-Y plane to the target borehole is oriented in the earth's coordinate system. We can now display the X-Y plane projection of the vector between the magnetometer and the solenoid assembly relative to gravity.

The acceleration data is telemetered to the surface along with the six magnetometer measurements or, alternatively, the tool face rotation is done downhole and corrected magnetometer measurements are telemetered to the surface.

Figure 3:
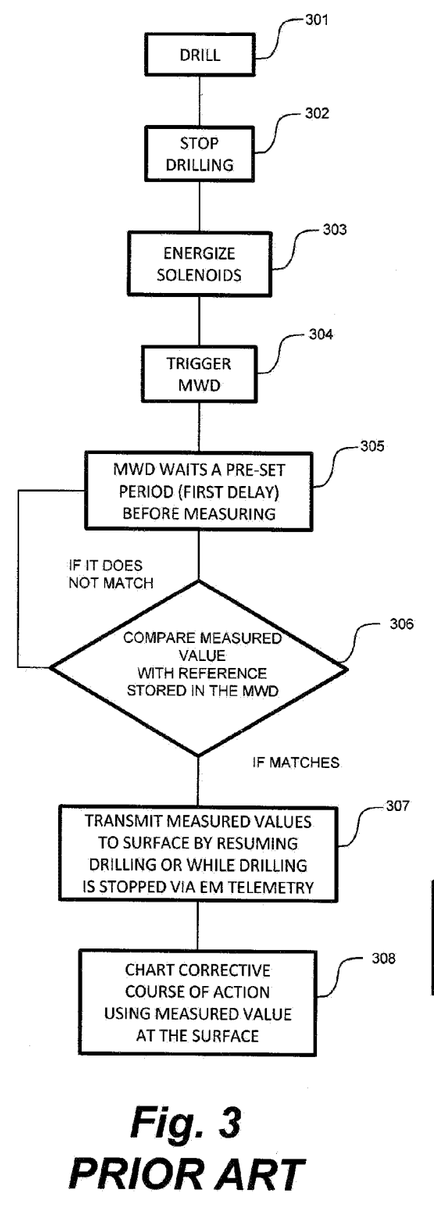
FIG. 3 is a flowchart illustrating prior art steps for measurement of magnetic field generated by energisation of the magnetic transmitter assembly in a conventional magnetic ranging method.

FIG. 3 illustrates the steps for measurement of the magnetic field generated by energisation of the magnetic sources in a conventional magnetic ranging method described in Kuckes and Clark.

Prior art measurement steps are subject to delays as illustrated in FIG. 3 of the drawings. The measurement steps in the prior art are as follows: start drilling of the second borehole (301); the drilling is stopped (block 302); the solenoid assembly pr magnetic transmitter assembly is energised (block 303); the MWD including the detector or three-axis magnetometer detects that drilling has stopped and activates the detector (block 304); the detector waits a first delay (block 305) before measuring the various components of the magnetic field; the detector compares the measured value with a reference value stored therein (block 306) to identify solenoid activity and transmits the value to the surface if solenoid activity is identified; and a corrective course is charted using the measured values (block 307). Delays are introduced when the MWD waits for a preset period of time before measuring (block 305) the magnetic field and when the measured values are compared with a reference value to determine whether the reference value is a solenoid related value (block 305).

Figure 4:
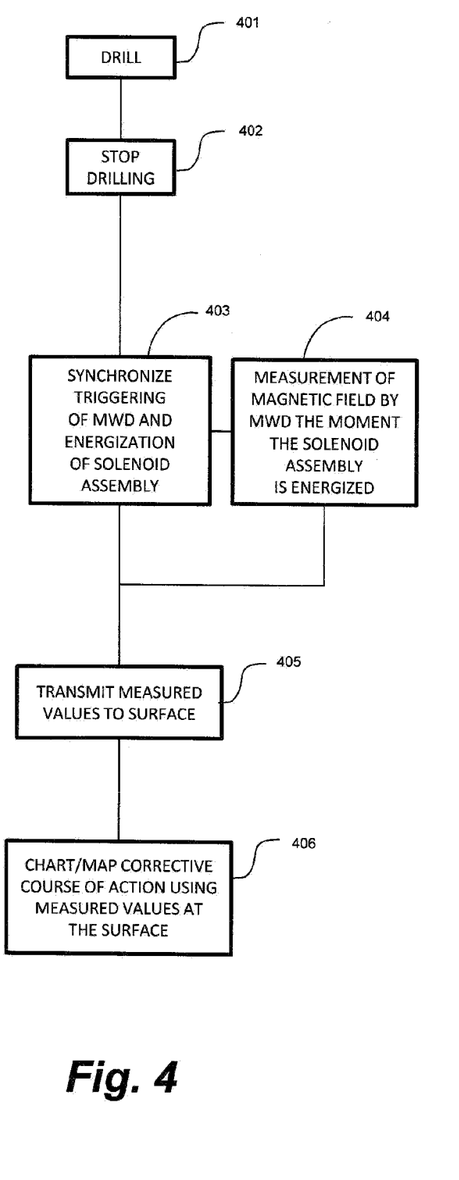
FIG. 4 is a flowchart illustrating the measurement steps according to one embodiment.

Herein, delays are eliminated through synchronicity of magnetometer and the solenoid assembly. Thus, survey duration is also reduced. The measurement steps according to one embodiment are illustrated in FIG. 4 of the accompanying drawings. One starts drilling of the second borehole (block 401). For a rotating drill string, drilling is stopped (block 402) for holding the three-axis magnetometer 13 rotationally stationary. Survey is started by synchronising triggering of the three-axis magnetometer 13 (block 403) and energisation of the magnetic transmitter assembly or solenoid assembly 3 (block 404). The solenoid assembly 3 is energised by passing DC current in each direction for about 10 seconds. This enables measurement and recordation of various components of the alternating magnetic field by the three-axis magnetometer 13 as soon as the solenoid assembly 3 is energised (block 405). As the triggering and the energisation is synchronised there is no uncertainty that the magnetic field being measured by the magnetometer is indeed that of the solenoid assembly 3. Therefore, the verification process and delay due to the verification process are eliminated. Since measurement starts the moment the solenoid assembly 3 is energised, the values of the magnetic field are recorded before the magnetic field falls off. Synchronicity also reduces the survey time as the DC current is passed in each of a first direction and then a second direction only for about 10 seconds. The values being recorded are also error free as the probability of the MWD 12 including the three-axis magnetometer 13 vibrating during the about 20 or so seconds (duration of the survey) is minimized. The measured or recorded values are transmitted to the surface, such as via EM telemetry (block 406) for computation of steering data for drilling the second borehole relative to the first borehole.

EM telemetry can be implemented through a variety of techniques. In one technique, electromagnetic signals are modulated according to a sensor response to represent one or more components of interest. These signals are detected by either a downhole EM transceiver or a surface EM transceiver at the surface. Using another EM telemetry technique, a current is created within the drill string and the current is modulated according to the sensor response to represent the one or more components of interest.

EM telemetry also results in faster data collection at the surface. The steering data or corrective course can also be computed downhole.

Figure 4A:
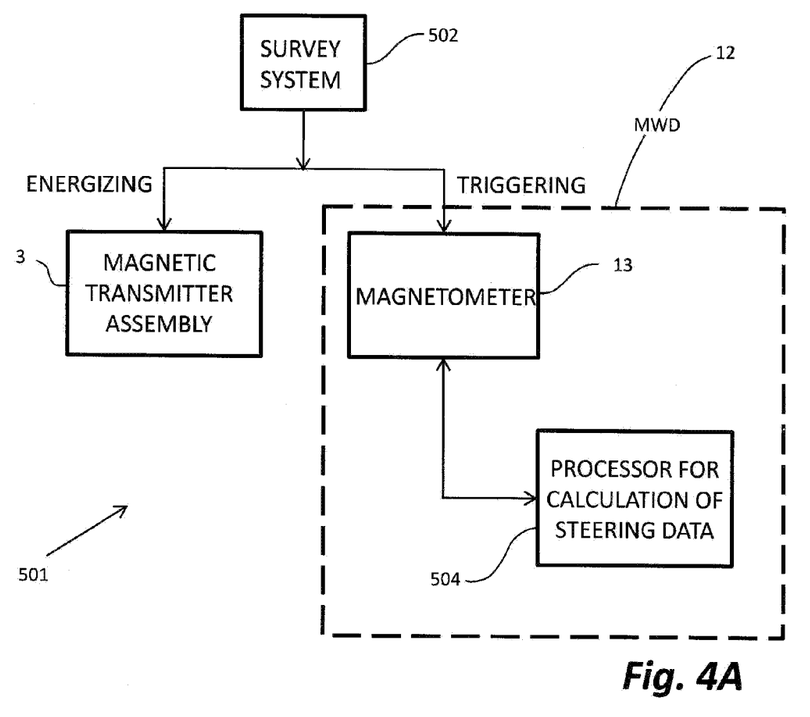
FIGS. 4A and 4B are block diagrams of a system for establishing synchronicity between triggering of a three-axis magnetometer and energising of a magnetic transmitter assembly according to another embodiment.
Figure 4B:
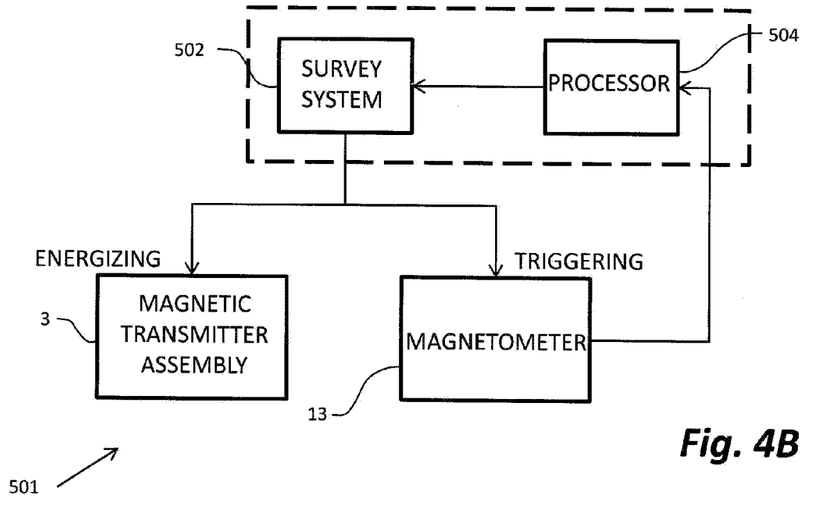

FIGS. 4A and 4B illustrate a system 501 for reducing delays according to another embodiment by triggering the three-axis magnetometer 13 using EM telemetry synchronous with energizing the magnetic transmitter assembly 3 from surface using a survey system 502. The survey system 502 is located at the surface. The magnetic field components measured by the magnetometer 13 are either transmitted to a processor 504 which is either located downhole (FIG. 4A) or at the surface (FIG. 4B) for calculation or computation of steering data. Depending on where the steering data is calculated, the steering data is communicated to the MWD 12 by the processor 504 or the survey system 502.

In one embodiment, synchronisation is achieved by initiating the energizing of the magnetic transmitter assembly 3 by wireline and triggering the three-axis magnetometer 13 from the surface using EM telemetry. As the delays in the measurement process are substantially eliminated, drilling progresses at the set rate.

The data, being recorded measured values or recorded measured components, is processed by the processor or computer 504, typically at surface, using a successive approximation technique to determine the range, and orientation of the borehole being drilled relative to the target borehole (block 406). The data analysis comprises combining the known spacer distance and measured components of the first and second magnetic flux densities using successive approximation inversion to produce the distance, the direction, and the orientation of the second borehole relative to the first borehole. Steering data, for drilling the second borehole relative to the first borehole, is determined using the recorded, measured components of the alternating magnetic fields.

If the processor 504 is located at the surface, the recorded components of the alternating magnetic field can be transmitted to surface through EM telemetry, between the downhole and surface EM transceivers. EM telemetry could be conducted while drilling i.e. survey is started while drilling. The determined steering data is then transmitted downhole by the survey system 502 via EM telemetry for drilling the second borehole relative to the first borehole. Here, for a short period of time, the second borehole is drilled without using the determined steering data.

The survey can also be started after drilling is stopped for better ensuring the magnetometer rotationally stationary 18. In this case, the second borehole is drilled at all times using the determined steering data. Here, the drilling is stopped, the survey is started and the recorded components of the alternating magnetic field are transmitted to the surface using EM telemetry for determining the steering data at the surface. The determined steering data are transmitted downhole via EM telemetry, and the second borehole is drilled relative to the first borehole using the determined steering data.

The steering data is used to steer the drilling of the second borehole such that it is in a prescribed relative geometric relationship to the target borehole. The relative geometric relationship can be, but is not limited to, a parallel borehole at a specified distance and direction from the target borehole. In the processing the differences between magnetometer measurements in the plus (+) and minus (−) states are taken to eliminate influences of constant fields such as the earth's field and fields from magnetized metals such as casings, and to therefore have a measure of only the solenoid fields. Advantage may be taken of this to reduce the number of magnetometer measurements transmitted to the surface by ½ by taking these differences downhole before transmission to the surface.

Accordingly, the second borehole 10 with the MWD tool 12 is drilled and steered a desired distance and direction from the first borehole 2 by using the distance, direction, and orientation calculations.

Figure 6A:
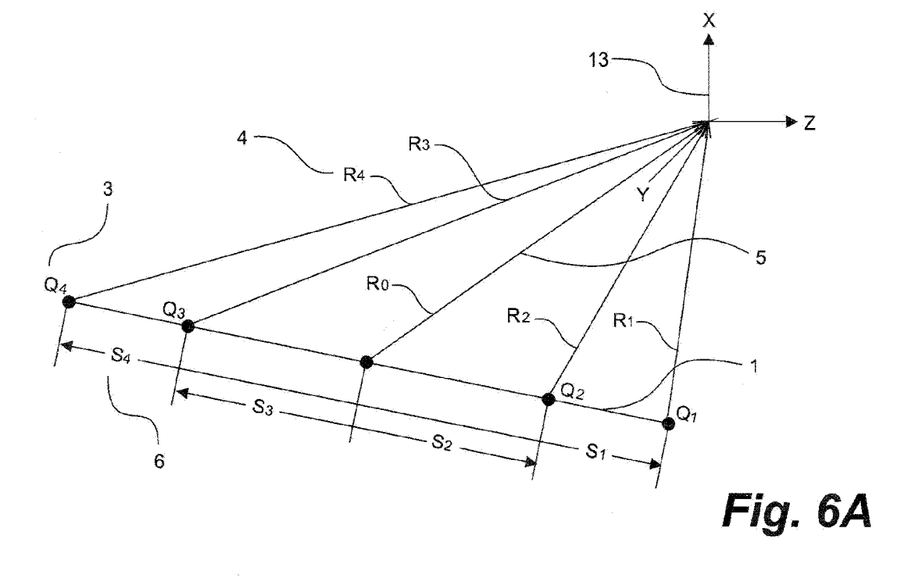
FIG. 6A is a schematic illustration of the vectors from each of the pole ends of each of the two solenoids to the magnetometer according to the embodiment of FIG. 5A.

FIG. 6A shows a depiction of the solenoid assembly 3 in the first borehole and the MWD tool magnetometer 13 depicted by an orthogonal xyz axis set. The individual solenoids 6, 7 are represented by a magnetic pole strength Q at or near the pole ends E1 through E4 of each solenoid Q1 through Q4. The pole strength Q is in Webers and is calculated as the area of the solenoid times the magnetic flux density at the ends of the solenoids.

$$Q = B \cdot A$$

Vectors R0, R1, R2, R3 and R4 from the solenoid assembly to the magnetometer represent the distance and direction from the center of the solenoid assembly to the magnetometer (R0) and the vectors (R1 through R4) from each of the magnetic pole ends E1-E4 to the magnetometer 13. The vectors representing the positions of the magnetic poles are represented as S1 through S4. Since the solenoids are part of a rigid assembly having the known spacer distance, the S vectors are parallel. The S vectors are the distance and direction from the center of the solenoid assembly to each corresponding magnetic pole E1-E4. Accordingly, S1 plus R1 is equal to R0. Similarly, S4 plus R4 is equal to R0, and so on. The magnitudes of S1-S4 are known as they are now known dimensions of the solenoid assembly 3 of the present invention. The distance and direction vector R0 is solved for through inversion using known standard iterative techniques. At the same time the relative direction angles of the magnetometer and the axis of the solenoid assembly are computed. FIG. 4A shows the solenoid axis vector in the frame of the magnetometer. The spherical polar angles θ and φ give the relative orientation of the magnetometer and solenoid respectively.

If the pole separation (E1,E2 and E3,E4) on each identical solenoid is Sps (slightly less than the solenoid lengths), and if the distance between the centers of the solenoids is Sss, then the unit direction vector of the solenoid assembly in the frame of the magnetometer is $$Us(\theta, \phi) = \begin{pmatrix} \sin(\theta)\cos(\phi) \\ \sin(\theta)\sin(\phi) \\ \cos(\theta) \end{pmatrix}$$

where θ and φ are the spherical polar coordinate angles in the frame of the magnetometer, then the vectors S1 through S4 can be expressed as:

$$S1 = Us(\theta, \phi) \cdot \left(\frac{Sss}{2} + \frac{Sps}{2}\right)$$

$$S4 = Us(\theta, \phi) \cdot \left(\frac{Sss}{2} - \frac{Sps}{2}\right)$$

$$S3 = Us(\theta, \phi) \cdot \left(\frac{Sss}{2} + \frac{Sps}{2}\right)$$

$$S4 = Us(\theta, \phi) \cdot \left(\frac{Sss}{2} - \frac{Sps}{2}\right)$$

The magnetic intensity vector B from each magnetometer reading without the influence of static fields is:

$$B1 = (B1+ - B1-)/2$$

where $$B1+ = (B1x+, B1y+, B1z+)$$

$$B1- = (B1x-, B1y-, B1z)$$

and $$B2 = (B2+ - B2-)/2$$

where $$B2+ = (B2x+, B2y+, B2z+)$$

$$B2- = (B2x-, B2y-, B2z-)$$

B1 and B2 may now be derived in terms of the components of the solenoid and the vector from the solenoid S to the magnetometer 13.

$$B1 = \frac{Q}{4\pi} \cdot \left[ \frac{R0 - Us(\theta, \phi) \cdot \left(\frac{Sss}{2} + \frac{Sps}{2}\right)}{\left\|R0 - Us(\theta, \phi) \cdot \left(\frac{Sss}{2} + \frac{Sps}{2}\right)\right\|^3} - \frac{R0 - Us(\theta, \phi) \cdot \left(\frac{Sss}{2} - \frac{Sps}{2}\right)}{\left\|R0 - Us(\theta, \phi) \cdot \left(\frac{Sss}{2} - \frac{Sps}{2}\right)\right\|^3} \right]$$

$$B2 = \frac{Q \cdot k}{4 \cdot \pi} \left[ \frac{R0 - Us(\theta, \phi) \cdot \left(-\frac{Sss}{2} + \frac{Sps}{2}\right)}{\left\|R0 - Us(\theta, \phi) \cdot \left(-\frac{Sss}{2} + \frac{Sps}{2}\right)\right\|^3} - \right.$$

$$\left. \frac{R0 - Us(\theta, \phi) \cdot \left(-\frac{Sss}{2} - \frac{Sps}{2}\right)}{\left[\left\|R0 - Us(\theta, \phi) \cdot \left(-\frac{Sss}{2} - \frac{Sps}{2}\right)\right\|\right]^3} \right]$$

All of the variables in the above equations have been defined previously defined except k which is the relative strength of second solenoid 7 relative to first solenoid 6. This parameter is either measured at the surface or calculated when the solenoids are downhole in the first borehole 2. The solenoid assembly components of Sss and Sps are also known.

Figure 6B:
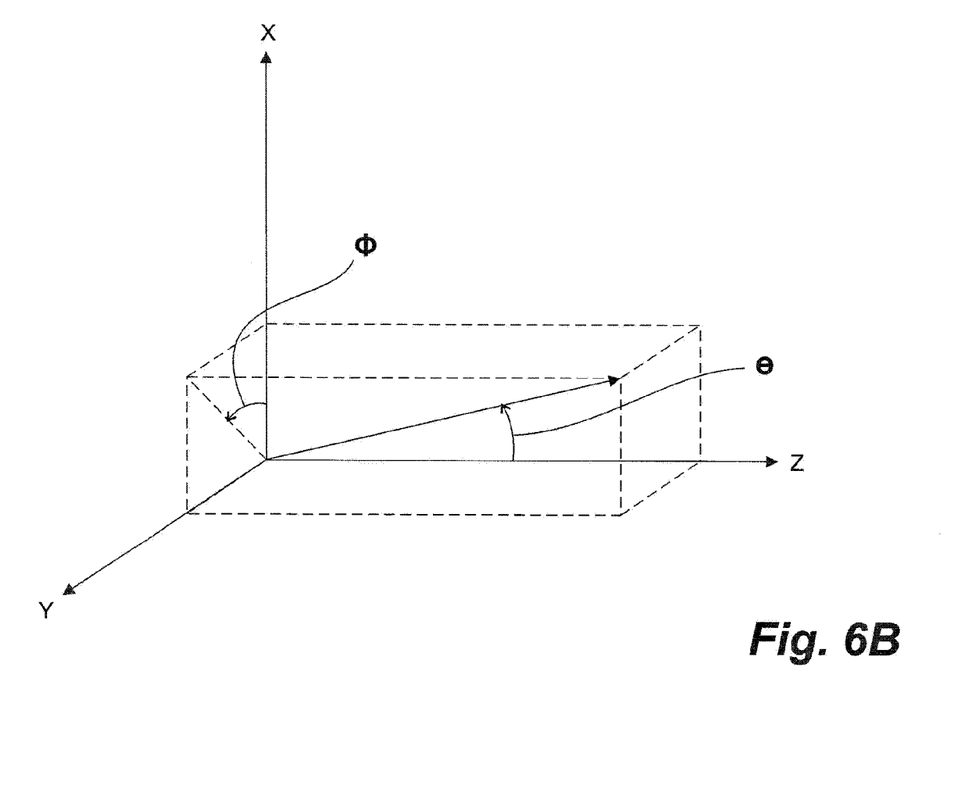
FIG. 6B is a coordinate system illustrating the relative direction angles of the magnetometer and solenoid assembly.

For the inversion, B1 and B2 are first measured (six measured components). Then R0, Q the pole strength, and ($\theta$, $\phi$) the direction angles of the solenoid (a total of six measurements) are solved for. The solution of these six equations and six unknowns has no closed form solution, therefore an iterative technique must be used. The inversion is performed by one or more well known standard iterative techniques such as Levenberg-Marquardt or a Gauss-Newton method. The vector, R0, and the unit direction vector of the solenoid assembly, Us($\theta$,$\phi$), are the required distance, direction, and orientation of the second borehole 10 relative to the first borehole 2. As a further step R0 and Us($\theta$,$\phi$) can also be transformed in a standard way by using inclination and tool-face information from the accelerometer sensor whose axes are aligned with the magnetometer to display the relative position of the two boreholes referenced to the gravity vector.

By virtue of the solenoids 6,7 being interconnected by the solenoid spacer 8, the distance therebetween is known precisely.

Previously, errors in measuring this distance, such as that introduced by the prior art moving a single solenoid an approximate distance between two positions, translates directly into an error in range calculation. For example, as set forth in the prior art patent U.S. Pat. No. '089 to Kuckes, at equation 10, Kuckes describes the "best way" to determine the distance r between two boreholes. Reproduced therein, equation 10 from Kuckes:

$$r = \frac{z_1 - z_2}{\alpha_1 - \alpha_2}$$

where
r is the range between the two boreholes and z1 and z2 are two chosen depth locations for a single solenoid, and
in the denominator $\alpha_1$ and $\alpha_2$ are functions of the magnetic field measurements at the two chosen depth locations.

Kuckes advises that a suitable application of the above is when the depths are chosen such that the alphas are approximately ±0.3. In this case Kuckes' equation 10 reduces to:

$$r = \frac{z_1 - z_2}{0.6}$$

Therefore an error measuring z1-z2 translates to an error in r of 1/0.6 or 1.66 times the error made in z1-z2. The error results from inaccuracies in determining the depth or distance between the two depth locations for the solenoid.

Typical applications for magnetic ranging is in horizontal boreholes in which the solenoid assembly 3 is conveyed in the first borehole 2 with a borehole tractor 5 and the depth is measured by a wireline cable played out from the surface, and the depth is usually inferred from an encoder wheel (not shown) on the wireline cable. Not required herein, measurement errors between two solenoid positions can occur in the prior art method due to slippage of the encoder wheel and stretch of the wireline cable under varying tension. The prior art is susceptible to such errors and results in errors in the estimation of range.

In embodiments of the invention, a further advantage to the two spaced solenoids 6,7, six measurement technique, is that there is no need to assume that the second borehole 10 being drilled is parallel to the target, first borehole 2. In addition to determining the distance between the two boreholes 10,2, and the direction of one borehole relative to the other, the present invention determines the relative orientation of the two boreholes, and does not assume that the two boreholes are parallel. Still further, embodiments of the present invention do not assume the individual solenoids to be point dipoles but, rather, as two pole ends E1,E2 and E3,E4 or two magnetic poles separated by the length of the solenoid. At distances which are large, with respect to the length of the solenoid, the point dipole approximation used by previous ranging techniques yields acceptable results, but, when the range to be determined is not large with respect the solenoid length the separated pole model is much better.

Figure 7:
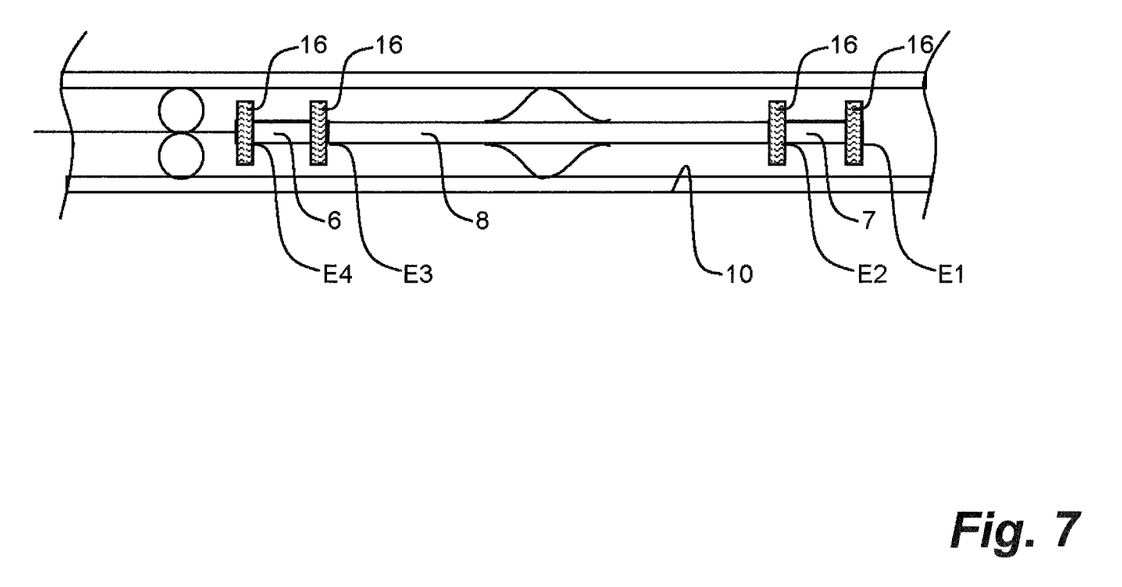
FIG. 7 is a schematic illustration of another embodiment of the present invention comprising magnetically permeable end pieces on the spaced solenoids of FIG. 5A positioned in a cased borehole.

FIG. 7 shows a preferred embodiment of the solenoid assembly 3 in a cased borehole which affords a more accurate location of the separated poles. In this embodiment magnetically permeable end caps or end pieces 16 are placed on the ends of each solenoid 6,7 to conduct the magnetic flux to a more precise location on the casing around the solenoid. These end pieces 16,16,16,16 are magnetically connected to the solenoid ends and are of a larger diameter than the solenoid itself so that the air gap between the solenoid ends and the casing is reduced or minimised. The result is that the location of the magnetic pole as seen from outside the casing is not "smeared" as much as several feet as it is with a solenoid with no end pieces.

Further, direct measurement of the pole positions can be made at surface, outside of the borehole. The solenoid assembly 3 can be placed in a piece of representative casing and a gauss meter is used to find the location of the poles E1-E4 by moving the probe of the gauss meter along the outside of the representative casing, finding maxima, and measuring the distance between maxima to obtain Sss.

We claim:

1. A method for minimizing delays in a magnetic ranging method while drilling a second borehole relative to a previously-drilled first borehole, the second borehole having a three-axis magnetometer deployed downhole therein and the first borehole having a solenoid assembly deployed therein, the method comprising:
  positioning the solenoid assembly in the first borehole approximately opposite the magnetometer in the second borehole;
  starting a survey with the magnetometer being rotationally stationary:
  triggering the magnetometer using electromagnetic (EM) telemetry synchronous with energizing of the solenoid assembly from surface to produce an alternating magnetic field in the second borehole;
  synchronous measuring components of the alternating magnetic field by the magnetometer as soon as the solenoid assembly is energised to minimize delay;
  determining steering data for drilling the second borehole relative to the first borehole using the measured components of the alternating magnetic field; and drilling the second borehole using the determined steering data.

2. The method of claim 1 further comprising determining the steering data at the surface.

3. The method of claim 1 further comprising determining the steering data downhole.

4. The method of claim 1 while drilling further comprising:
transmitting the measured components of the alternating magnetic field to the surface using EM telemetry for determining the steering data at the surface;
receiving the determined steering data downhole via EM telemetry; and
drilling the second borehole relative to the first borehole using the determined steering data.

5. The method of claim 1 further comprising:
stopping drilling before starting the survey for holding the magnetometer rotationally stationary;
transmitting the measured components of the alternating magnetic field to the surface using EM telemetry for determining the steering data at the surface;
receiving the determined steering data downhole via EM telemetry; and
drilling the second borehole relative to the first borehole using the determined steering data.

6. The method of claim 5 wherein stopping drilling comprises stopping rotation of a rotating drill string from the surface.

7. A method for minimizing delays in a magnetic ranging method while drilling a second borehole relative to a previously-drilled first borehole, the second borehole having a three-axis magnetometer and a three-axis accelerometer deployed therein and the first borehole having two magnetic field sources, a first magnetic field source and a second magnetic field source, the first and second magnetic field sources being spaced by a rigid, non-magnetic spacer of known spacer distance, the method comprising:
positioning the two magnetic field sources in the first borehole approximately opposite the magnetometer in the second borehole;
starting a survey with the magnetometer being rotationally stationary:
triggering the magnetometer using electromagnetic telemetry (EM) synchronous with energizing of the two magnetic field sources from surface to produce an alternating magnetic field in the second borehole;
synchronous measuring components of the alternating magnetic field by the magnetometer as soon as the two magnetic field sources are energised to minimize delay;
measuring three-axis acceleration data from the three-axis accelerometer;
determining distance, direction and orientation of the second borehole relative to the first borehole using the measured components of the alternating magnetic field, the three-axis acceleration data and the known spacer distance; and
drilling the second borehole using the determined distance, direction and orientation.

8. The method of claim 7 wherein the simultaneous energisation of the first and second magnetic field sources and triggering of the three-axis magnetometer further comprises:
synchronising triggering of the magnetometer with the energisation of the two magnetic field sources; the two magnetic field sources being activated by energizing the first magnetic field source and measuring components of a first magnetic flux density measured by the magnetometer, and then energizing the second magnetic field source and measuring components of a second magnetic flux density measured by the magnetometer.

9. The method of claim 8 wherein determination of the distance, direction and the orientation using the measured components further comprises:
combining the known spacer distance, the measured components of the first and second magnetic flux densities and the three-axis acceleration data using successive approximation inversion to produce the distance, direction, and the orientation of the second borehole relative to the first borehole.

10. The method of claim 7 wherein the triggering of the three-axis magnetometer is synchronised with the energisation of the first magnetic field source.

11. The method of claim 7 wherein the two magnetic field sources are energised by a DC current and the energizing comprises alternating the first and second magnetic field sources in both positive and negative states.

12. The method of claim 11 further comprising alternating the positive and negative states at frequencies at less than 1 Hz.

13. The method of claim 12 further comprising alternating the positive and negative states at frequencies at about 2 times per minute.

14. The method of claim 7 wherein the energizing of the first and second magnetic field sources further comprises:
alternating the first magnetic field source in both positive and negative states and measuring components of a first magnetic flux density;
alternating the second magnetic field source in both of the positive and the negative states and measuring components of a second magnetic flux density; and
combining the measured components of the first and second magnetic flux densities further comprises obtaining a difference between the first magnetic flux density in the positive and negative states and obtaining the difference between the second magnetic flux density in the positive and negative states.

15. The method of claim 7 further comprising:
drilling the second borehole with a drilling assembly having the magnetometer incorporated therewith.

16. The method of claim 15 wherein the drilling assembly is supported on a coiled tubing and mud motor holding the magnetometer rotationally stationary while drilling.

17. The method of claim 7 further comprising conveying the two magnetic field sources along the first borehole using a tractor.

18. The method of claim 7 further comprising initiating energizing of the two magnetic field sources by wireline.

19. The method of claim 7 further comprising:
providing magnetically permeable end caps on pole ends of each magnetic field source of the two magnetic field sources;
locating the two magnetic field sources in a cased first borehole;
producing alternating magnetic fields by energising the two magnetic field sources; and
conducting the alternating magnetic fields through the end caps for accurate location of the two magnetic field sources in the first borehole.

20. The method of claim 19 wherein an air gap between the two magnetic field sources and the cased first borehole is minimised by providing end pieces of a larger diameter than each of the two magnetic field sources on the ends thereof.

21. A system for minimizing delays in a magnetic ranging method while drilling a second borehole relative to a previously-drilled first borehole, the second borehole having a three-axis magnetometer deployed therein and the first borehole having a magnetic transmitter assembly deployed therein, the system comprising:
- a survey system for synchronous energisation of the magnetic transmitter assembly from surface, to produce an alternating magnetic field in the second borehole, and triggering of the magnetometer using electromagnetic (EM) telemetry, configured to start measuring components of the alternating magnetic field synchronously to minimize delay, the survey system communicating with the three-axis magnetometer through a surface EM transceiver and a downhole EM transceiver, the energisation of the magnetic transmitter assembly producing an alternating magnetic field in the second borehole, components of the alternating magnetic field being measured at the magnetometer; and
- a processor for determining steering data for drilling the second borehole relative to the first borehole using the measured components of the alternating magnetic field for use by the three-axis magnetometer in communication with the survey system.

22. The system of claim 21 wherein the magnetic transmitter assembly comprises a first magnetic field source spaced from a second magnetic field source by a rigid, non-magnetic spacer of known distance.

23. The system of claim 22 wherein the first magnetic field source and the second magnetic field source are energized by activation in a first polarity by an activation current in a first direction and by activation in a second polarity by reversing the activation current in a second direction for producing the alternating magnetic field corresponding to the activation current in the second borehole.

24. The system of claim 23 further comprising a wireline between the magnetic transmitter assembly and surface wherein the activation current in the first and second directions are conveyed by the wireline.

25. The system of claim 21 further comprising a three-axis accelerometer deployed in the second borehole for measuring three-axis acceleration data at the magnetometer.

26. The system of claim 25 wherein the steering data comprises distance, direction and orientation of the second borehole relative to the first borehole and is determined using the measured components of the alternating magnetic field, the three-axis acceleration data and the known spacer distance.

27. The system of claim 21 further comprising:
- a drilling assembly incorporating the magnetometer and for drilling the second borehole.

28. The system of claim 21 further comprising:
- a tractor for conveying the magnetic transmitter assembly to be deployed approximately opposite the magnetometer.

29. The system of claim 21 wherein the processor is located downhole and the steering data is determined downhole.

30. The system of claim 21 wherein the processor is located at the surface and the steering data is determined at the surface and the processor is in communication with the three-axis magnetometer through the survey system.

* * * * *